United States Patent [19]

Mung-Kuen Luk

[11] 4,198,861
[45] Apr. 22, 1980

[54] TEMPERATURE INDICATORS

[75] Inventor: Catherine Mung-Kuen Luk, Kowloon, Hong Kong

[73] Assignee: Carice International Products, Ltd., Kowloon, Hong Kong

[21] Appl. No.: 940,746

[22] Filed: Sep. 8, 1978

[30] Foreign Application Priority Data

Sep. 12, 1977 [GB] United Kingdom ............... 37991/77

[51] Int. Cl.² ........................................... G01K 11/12
[52] U.S. Cl. ..................................... 73/356; 128/736
[58] Field of Search ......................... 73/356; 128/2 H

[56] References Cited

U.S. PATENT DOCUMENTS

| 3,661,142 | 5/1972 | Flam | 73/356 |
| 3,965,742 | 6/1976 | Parker | 73/356 |
| 3,998,210 | 12/1976 | Nosari | 73/356 |
| 4,030,482 | 6/1977 | Navato | 73/356 |

FOREIGN PATENT DOCUMENTS 1344206 12/1974 United Kingdom ..................... 73/356

*Primary Examiner*—S. Clement Swisher
*Attorney, Agent, or Firm*—Laff, Whitesel & Rockman

[57] ABSTRACT

An indicator which is suitable for measuring a body temperature has a generally planar member shaped for retention against a very small outer surface of a body. A temperature-sensitive material is visually activatable within a predetermined temperature range. The temperature-sensitive substance emits, reflects or refracts visible radiation to indicate the temperature. The color sequence in normal white light progresses from tan through red, green and blue and ultraviolet on temperature activation, the color red normally being the first easily visible response when the temperature reaches its responsive range. Thereafter, the color falls off and tends to remain a blue color after the temperature moves above the activation range. An optical filter visually blocks out the blue color to limit the response to the active range.

7 Claims, 4 Drawing Figures

TEMPERATURE INDICATORS

The present invention relates to a temperature indicator, such as a thermometer, particularly but not exclusively to a digital liquid crystal temperature indicator suitable for body temperature measurement and to a method of measuring temperature, especially measuring the body temperature of a human being.

Heretofore, body temperature has normally been measured using mercury and alcohol thermometers, for example, by holding the thermometer under the tongue for a period of up to several minutes or rectally as in the case with children. Conventional thermometers can be cumbersome to use and drawbacks can occur, particularly when these thermometers are used to measure the temperature of, for example, infants, children, hospital patients who are asleep or unconscious and elderly persons. Besides inconvenience, conventional body mercury thermometers utilize a glass tube, thereby creating the danger of possible breakage and injury from glass splinters and poisoning from the released mercury.

Moreover, despite general attitudes, the ordinary glass thermometer, as shown by medical studies, for example, Oral Thermometry, *The Guthrie Bulletin*, W. C. Beck, M.D. and B. St. Cyr, R.N., Vol. 43, April, 1974, pp. 170-185, requires, on an average, 11 minutes to reach a reliable reading. Even then, such studies indicate that the accuracy of such readings on the standard commercial thermometer ranges from ±0.2° to ±2.6° F. (see pp. 175-176 of the Bulletin). The widespread use of only 3 minutes for taking a reading leads to greater inaccuracies.

An object of the present invention is to overcome or at least mitigate one or more of the above-mentioned limitations inherent in the conventional glass thermometer.

According to a first aspect of the present invention, there is provided a temperature indicator suitable for measuring body temperature, which temperature indicator comprises a generally planar member shaped suitably, for example, for retention against an outer surface of a body, the member comprising a temperature-sensitive material which is activatable within a predetermined temperature range to be measured such that, at a temperature within the predetermined temperature range, the temperature-sensitive material emits and/or reflects visible radiation so as to indicate visibly that the temperature at the surface of the body is within the predetermined temperature range.

The visible indication may be in the form of symbols. Advantageously, there are a plurality of deposits of temperature-sensitive material, the deposits being such that, on temperature activation, one or two of the deposits emit and/or reflect visible radiation so as to indicate one or two of a plurality of symbols at the front of the member, which one or two visible symbols indicate the temperature of the body.

According to a second aspect of the present invention, there is provided a temperature indicator suitable for measuring body temperature, which temperature indicator comprises a generally planar member suitable for retention against a surface of a body, the member comprising deposits of temperature-sensitive material, which deposits are activatable within a predetermined temperature range to be measured and are arranged such that, on temperature activation, the deposits emit and/or reflect visible radiation so as to indicate numerals at the front of the member, which numerals indicate the temperature of the body, such as the temperature of the surface of the body.

According to a third aspect of the present invention, there is provided a method of measuring human body temperature, which method comprises utilizing a temperature indicator to indicate the temperature at the surface of the body, which temperature indicator comprises a generally planar member suitable for retention against the surface of a body, the member comprising a temperature-sensitive material which is activatable within a predetermined temperature range to be measured such that, at a temperature within the range, the activated material emits and/or reflects visible radiation so as to indicate visibly that the temperature of the surface of the body is within the said predetermined temperature range.

While the principle involved appears simple, the practical aspects are far more complicated if accurate temperature readings are sought. Because the temperature of the outer surface of the body is being measured, care must be given to the relationship between a given body location's temperature and its susceptibility to variability. Controlling variability is of some importance to external body thermometry if accuracy is sought to be achieved. Not only does external temperature affect the body's surface temperature, but the body's temperature is highly variable, even over small distances. Therefore, in the selection of the size and shape of the body thermometer, care should be given so as to minimize these variable factors and also optimize those zones that provide reliable readings.

It has now been found that small, concentrated areas, such as ovals, circles and rectangles, that stay roughly within 1.5 square inches in size achieve this optimizing for human thermometry. A preferred embodiment of the present invention includes this feature.

The temperature-sensitive substance is normally a cholesteric liquid crystal compound that produces a visible color change in response to temperature activation. The temperature-sensitive substance emits and/or reflects and/or refracts visible radiation to indicate the temperature visibly. The color sequence in normal white light being tan, red, green and blue and ultraviolet on temperature activation, the color red normally being the first visible response of the liquid crystal when experiencing a temperature within its responsive range. The second response will be the color green as the temperature reaches the mid-zone of the temperature responsive zone. The final color response, that is a blue color, is the reaction to the temperature going beyond the temperature-responsive zone of a given liquid crystal. The blue color has a tendency, however, to remain visible for some time after the temperature has exceeded the activation zone of the liquid crystal, thereby causing a visible reaction that may be misleading or confusing to those attempting to read the temperature indicator. A preferred embodiment of the present invention overcomes this difficulty by employing an optical filter, as more fully discussed hereinbelow, that visually blocks out the blue color response of the liquid crystal. The liquid crystal is preferably selected so as to be responsive to a given temperature. As a result, it is possible to limit the visible reading to one numeral or symbol. Two numerals or symbols may appear at the front of the member, however, when the temperature of the body is between the temperature indicated by the two numerals. Thus, if the numerals were 102 and 104 and a temperature indicating 103 were to be experienced by the body, both numerals 102 and 104 would be visible, thereby indicating a reading of 103. If an optical filter is not in use to block the blue color, it would be likely that three numerals would be visible at one time which may cause some confusion in the interpretation of the readout. The optical filter may be a yellow color plastics film.

Advantageously, the member comprises a non-transparent sheet of plastics material having transparent portions in the form of numerals, the liquid crystal deposits being selectively situated behind said numerals. In such an embodiment, a separate optical or color filter is, preferably, situated between each deposit and the respective transparent portions of the plastics material sheet. Alternately, the sheet of plastics material could be adapted to act also as a filter.

Conveniently, the sheet is of transparent material that is made opaque on one side thereof, such as the back, except for the portions that are allowed to remain transparent. The sheet can be made opaque using the process of silk-screen printing using a black base ink. Advantageously, the back of the sheet having the deposits thereon also has a coating to cover all the numerals, the coating, preferably being applied by the process of silk-screen printing using a black base.

In a preferred embodiment, there is visible at the front of the sheet, a transverse center line dividing the sheet into two zones, one having the reference letter "N" and the other having the reference letter "F," the numerals such as 94, 96 and 98 corresponding to a normal temperature in the Farenheit scale, being situated in the "N" zone of the sheet and the numerals, such as 100, 102 and 104 corresponding to a fever temperature in the Farenheit scale, being situated in the "F." The line and reference numerals may be applied to the sheet by the process of silk-screen printing. Advantageously, the back of the sheet has adhesive thereon to enable the sheet to be attached readily to a surface of the body such as to the forehead, the sheet being covered by a release paper, or the like.

A preferred embodiment of the present invention utilizes the correlation between skin temperature and the internal temperature, such as oral temperatures, of the body. For example, in this embodiment, the indicator can be such as to indicate not the actual skin temperature but the internal, such as oral, temperature corresponding to that actual skin temperature. One advantage of this embodiment is that most people are familiar with oral temperature readings. Studies of correlation between internal, such as oral, and skin temperature show that for an accurate reading on the forehead, the liquid crystals should operate at 4.3° F. below the normal temperature to indicate a normal temperature. In other words, external cooling at normal temperature lowers the external temperature by approximately 4.3° F. In a preferred embodiment, since for reasons of prudence it would be unadvisable to rely on this differential when a person has a fever, a differential of 2.3° F. below the fever temperature is used for the response temperature of the liquid crystals on the forehead. Thus, for a 38° C. temperature reading a liquid crystal responsive to 37° C. is used and for a 36° C. temperature reading a liquid crystal responsive to 35° C. is used. For normal temperatures, a liquid crystal having a 90° F. center is used, often having a 5° spread for the normal temperature and, for lower temperatures, a liquid crystal having a narrow band selection is used.

For a better understanding of the present invention and to show how the same may be put into effect, reference will now be made, by way of example, to the accompanying drawing, in which.

Figure 1:
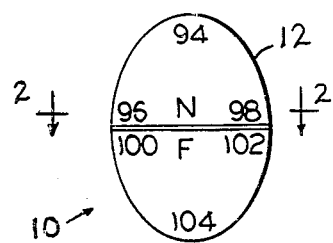
FIG. 1 shows an embodiment of a temperature indicator in accordance with the present invention.
Figure 4:
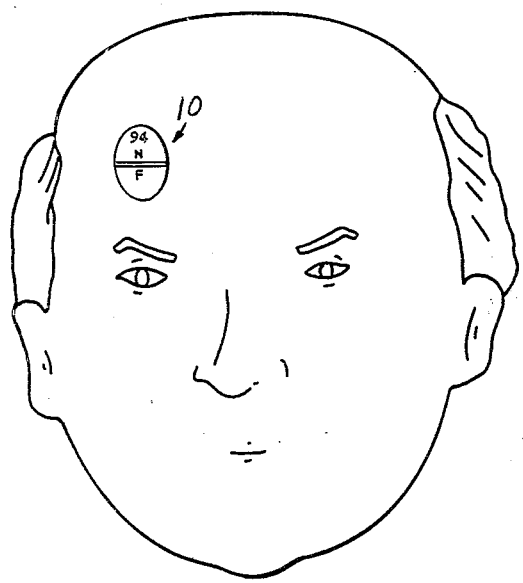
FIG. 4 is a schematic showing of a person in the process of having a temperature reading.

FIG. 1 shows a temperature indicator 10 in the form of an oval disc, black in appearance, having an adhesive back adapted to be affixed to the forehead of a person, as shown in FIG. 4. As there shown, the disc 10 is of small size in relation to the forehead of a person. Color markings are visible at the front of the disc, namely, a transverse center line and the letters "N" and "F" positioned centrally above and below the line and adjacent thereto, indicating a normal zone and a fever zone, respectively.

The oval disc comprises an oval thin transparent sheet of plastics material 12, such as a plastics filter film 20 of transparent material, having reference numerals imprinted on one side, preferably the back thereof when situated in the finished disc, for example, using the process of silk-screen printing in black color base ink. The letters and line are applied preferably to the back of the sheet, for example, using the process of silk-screen printing. The reference numerals are arranged so that the numerals 94, 96, 98 are situated sequentially in a counterclockwise manner in the upper zone of the oval sheet above the transverse line, that is in the normal zone. The reference numerals 100, 102 and 104 are situated sequentially in a clockwise manner in the lower zone of the sheet and below the transverse line, that is in the fever zone.

A plurality of deposits 14,16,18 of a cholesteric compound, commonly called liquid crystals, is situated behind each reference numeral, each deposit responding at a different temperature within the range of 94° F. and 104° F. internal body temperature. Variations in color of the deposits are achieved according to the temperature response of the liquid crystals as previously described.

An optical filter, such as a circular yellow color plastics filter film 20, is situated between each deposit and the sheet to filter the color tone of blue and ultraviolet, thereby avoiding the continuous display of a blue reading, as earlier discussed. The optical filter may also make the colors tan and red more visible and the color green more vivid. A dark coating 22 is applied at the back of the sheet to cover all the numerals, thereby enhancing the readability of the indicator.

An adhesive 24 can be applied to the back of the disc to enable the disc to enable it to be attached to the forehead of a person. If an adhesive is applied, it should comply with safety and hygienic requirements acceptable for medical use. For convenience, a release paper (not shown) covers the adhesive.

Advantageously, the dark coating is simply a black base applied to the sheet after application of the deposits and filters thereto, for example, using a process of silk-screen printing. The treatment preferably commences with the silk-screen printing of the numerals and markings on the sheet followed by the application of the deposits and filter to the sheet. The further silk-screen printing is then applied to cover all the numerals and, finally, the adhesive is applied. As is apparent, the disc can be die-stamped from a sheet and then treated as described above or, preferably, the sheet can be treated as described above and, after the treatment, oval shapes die-cut therefrom.

At normal room temperature, the liquid crystals do not respond to give a color change and, therefore, no reference numerals are normally visible at the front of the disc. On use of the indicator, the release paper, if present, is removed from the back of the disc and the temperature indicator is applied by pressing the adhesive on the back thereof, for example, to the forehead, in the area where the right and left superior orbital artery traverses the eyebrow. As a factor in the reliability of the temperature readings, location and size of the indicator is of some importance, the location above the right and left superior orbital artery, as an illustration, provides a relatively reliable measure.

Figure 2:
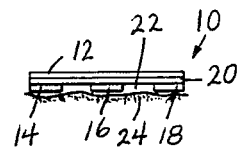
FIG. 2 is a cross section of the indicator of FIG. 1, taken along line 2—2 thereof.
Figure 3:
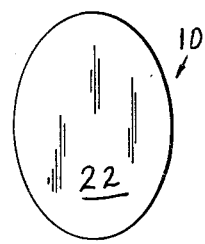
FIG. 3 is a plan view of the back of the indicator of FIG. 1.

After a few seconds, the temperature indicator will begin to display the temperature corresponding, for example, to the internal body temperature. Normally, only one of the numerals is activated. If, however, the temperature corresponds to a temperature between two of the numerals, two numerals activated, the lower numeral normally being of a color in the lower green region of the color sequence and the higher numeral being of a color at the higher, reddish region of the color sequence (see FIG. 2).

The temperature indicator can be readily attached to the forehead of a person or a child and can give a relatively accurate, continuous reading in a matter of seconds. Because of the positioning of the temperature readings 94 to 98 in the "N" zone (normal) and the temperature readings 100 to 104 in the "F" zone (fever), the degree of the temperature that is normal or fever can be readily seen. If required, different reference numerals can be chosen on a different scale; for example, centigrade readings can be used.

As is the case when measuring body temperature, care should be taken when using this embodiment temperature indicator. Advantageously, the person should be in a restful condition and the forehead should be dry because a forehead, wet through perspiration or otherwise, may result in the indicator reading a lower than the actual body temperature. Drafts and strong light or heat should be avoided during a reading such as direct sunlight or being too close to stoves, heaters and air conditioners. Advantageously, the ambient temperature should be from 60° F. to 85° F. when using the temperature indicator. However, if the ambient temperature is below 60° F., 1° F. should be added to the reading and, if the ambient temperature is above 85° F., 1° F. should be subtracted from the reading. The indicator can be reused and, if the adhesive backing should lose its effectiveness in time, the disc can readily be attached to the forehead by applying cellophane tape or adhesive tape to the front of the disc and to the forehead.

For ease of use and protection, the temperature indicator is preferably kept in a plastic material case having an oval insert or oval-shaped flange to retain the thermometer in position.

This embodiment indicator is, therefore, easy to use, quick, safe, reliable, convenient and unbreakable. This embodiment indicator is substantially easier to read than the conventional body thermometer. In addition, the indicator is unbreakable in the traditional sense of glass thermometers. Moreover, by providing a continuous reading, the indicator enables the user to monitor hospital patients, invalids and children without repeated disturbance. And, most importantly, the indicator provides a reliable temperature reading in seconds, whereas the conventional thermometer requires many minutes.

A preferred embodiment of the temperature indicator consists of an oval disc comprising an inert plastic substrate coated with cholestric liquid mixture and laminated with inert black backing and hypo-allergenic medical grade adhesive. The oval disc is preferably 2.54 cm in length, 1.94 cm in width and 0.051 cm thick and measures body temperature in 1° centigrade increments. When affixed to the body surface, the indicator is affixed, in use, to the supraorbital region of the forehead and indicates a digital reading of the temperature. If the temperature lies between digits, two numerals appear at the same time. Alternatively, the disc can be oval, for example, 1 inch in length and ¾ inch side, that is, having a surface area of 1.75 square inches.

Digits can be selected as desired. Preferred selection is 94° F., 96° F., 98° F., 102° F., 104° F. or 37° C., 39° C., 40° C., 41° C., 43° C. although, if required, the 94° F. or 35° C. can be omitted.

Some of the advantages of the invention should now be apparent. The prior art has generally built digital thermometers upon a somewhat less than completely flexible substrate backing. That backing sometimes caused abrasion to the skin, especially around the edges thereof. It did not conform very well to the compound curves of the body. The structure built upon the substrate had an unfinished appearance.

The invention has the substrate on the outside, with the thermometer structure built back from it. Therefore, the somewhat less than completely flexible substrate of the invention does not directly touch the skin. It is easier for the back of the inventive structure to adhere to the skin over the compound contours of the body. There is a greatly reduced tendency for the inventive thermometer to delaminate when it is built in this manner. The portion of the thermometer which is seen when a reading is taken has a finished appearance.

Another advantage centers about the sequence of color as the temperature changes. The normal sequence is for the color of the liquid crystal to move from tan, through red, green to blue and violet. In the prior art, it has been very difficult to interpret whether the color is tan or red, or whether it is green, blue or violet, especially since people's color perception varies widely from those who are color-blind to those who can easily dissect the components of a color. Thus, there is an ambiguity as to the reading.

When efforts are made to provide too fine a resolution of readings, the ambiguity is exacerbated because there are a number of different readings for each of the already hard-to-distinguish color gradations. Beyond this, a liquid crystal does not merely switch on or off. Rather, once activated at its critical temperature, the crystal tends to remain activated at higher temperatures, where it theoretically should cease its activity. Therefore, there is a blue trail of activated temperature readings which follow the "true" reading.

The invention avoids and overcomes these problems in two ways. First, the invention uses an optical filter which complements the blue color in the trail of the true reading. Since the optical filter and the blue trail are complementary, the blue reading is blocked and, therefore, not visible to contribute to the confusion. Second, the invention does not attempt to provide a fine scale of readings. Instead, it provides a relatively coarse scale with overlapping readings. If there is one reading on the inventive thermometer, that is the temperature. If there are two simultaneous readings, the temperature is midway between them. It is much easier to distinguish between one or two simultaneous readings, as compared with distinguishing between two or three simultaneous, but ambiguous, colors.

In summary, the prior art thermometers were too critical, too confusing, too expensive, and appeared to be a rough and unfinished product. The inventive thermometer has less critical components, has an unambiguous reading and a finished appearance.

Those who are skilled in the art will readily perceive how to modify the system. Therefore, the appended claims are to be construed to cover all equivalent structures which fall within the true scope and spirit of the invention.

What I claim is:

1. A temperature indicator for measuring body temperature, said temperature indicator comprising a transparent generally planar outer member having a relatively small area for retention against a limited, small, outer surface of a body, the member comprising a plurality of discrete temperature-sensitive means attached to the back of said outer member, each of which discrete temperature-sensitive means including a liquid crystal material which is activatable within an individually and separately predetermined temperature range to emit or reflect visible radiation through said outer means, which radiation indicates visibly that the temperature range detected by an activation of said material, said predetermined ranges overlapping so that emission from any one material indicates one temperature range and simultaneous emission from two materials indicates a temperature range which is between the ranges of temperatures at which the two materials emit, optical filter means interposed between said transparent outer member and said liquid crystal material for reducing response of the liquid crystals in the blue color range, whereby the liquid crystal display is substantially inactivated after its temperature passes beyond its activation range.

2. An indicator according to claim 1, in which temperature symbology is formed on said transparent outer member in front of a plurality of deposits of said temperature-sensitive material on the back of said transparent outer member, the deposits being such that, on temperature activation, one or two of the deposits emit and/or reflect visible radiation through said symbology to indicate visibly one or two temperature readings on the front of the transparent member, said one or two visible readings indicating the temperature of the body.

3. An indicator according to claim 1 wherein the transparent member is about 1.5 square inches or less in area.

4. An indicator according to claim 1 wherein the transparent outer member comprises a sheet having non-transparent portions on the back thereon, the transparent portions being alphanumerical forms and the temperature-sensitive materials being deposits situated behind transparent portions bearing alphanumerical forms which correspond to the temperatures sensed by the material.

5. An indicator according to claim 1 wherein the front of the planar member is divided into two zones, one indicating normal body temperature and the other indicating fever body temperatures.

6. An indicator according to claim 1 wherein the back of the indicator has adhesive means for enabling an attachment thereof to a forehead of a person.

7. An indicator according to claim 6 which is oval in shape.

* * * * *